(12) United States Patent
Xu et al.

(10) Patent No.: US 11,315,152 B2
(45) Date of Patent: Apr. 26, 2022

(54) SYSTEM AND METHOD FOR PERSONALIZED PRODUCT RECOMMENDATION USING HIERARCHICAL BAYESIAN

(71) Applicants: Beijing Jingdong Shangke Information Technology Co., Ltd., Beijing (CN); JD.com American Technologies Corporation, Mountain View, CA (US)

(72) Inventors: Zhexuan Xu, Mountain View, CA (US); Yongjun Bao, Mountain View, CA (US)

(73) Assignees: BEIJING JINGDONG SHANGKE INFORMATION TECHNOLOGY Co., Ltd., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 606 days.

(21) Appl. No.: 16/274,468

(22) Filed: Feb. 13, 2019

(65) Prior Publication Data
US 2020/0258132 A1 Aug. 13, 2020

(51) Int. Cl.
G06Q 30/02 (2012.01)
G06N 20/00 (2019.01)
G06N 7/08 (2006.01)
G06N 7/00 (2006.01)

(52) U.S. Cl.
CPC ........ *G06Q 30/0282* (2013.01); *G06N 7/005* (2013.01); *G06N 7/08* (2013.01); *G06N 20/00* (2019.01)

(58) Field of Classification Search
None
See application file for complete search history.

(56) References Cited

PUBLICATIONS

Guigourès, Romain, et al. "A hierarchical Bayesian model for size recommendation in fashion." Proceedings of the 12th ACM Conference on Recommender Systems. 2018. pp. 392-396. (Year: 2018).*

Liu, Hsiu-Wen. "A personalized consideration set recommender system: A hierarchical Bayesian approach." Journal of Marketing Analytics 1.2 (2013): 81-98. (Year: 2013).*

(Continued)

*Primary Examiner* — Vincent Gonzales
(74) *Attorney, Agent, or Firm* — Scully Scott Murphy & Presser

(57) ABSTRACT

A method and system for product recommendation. The method includes: defining, by a computing device, a hierarchical Bayesian model having a latent factor; training, by the computing device, the hierarchical Bayesian model using a plurality of training events to obtain a trained hierarchical Bayesian model, each event comprising feature of a product, brand of the product, feature of a user, and action of the user upon the product; predicting, by the computing device, a possibility a target user performing an action on a target product using the trained hierarchical Bayesian model; and providing product recommendation to the target user based on the possibility.

18 Claims, 4 Drawing Sheets

(56) References Cited

PUBLICATIONS

Zamzami, Nuha, and Nizar Bouguila. "Consumption behavior prediction using hierarchical Bayesian frameworks." 2018 First International Conference on Artificial Intelligence for Industries (AI4I). IEEE, 2018. pp. 31-34. Sep. 26, 2018. (Year: 2018).*

Linden, Greg, Brent Smith, and Jeremy York. "Amazon. com recommendations: Item-to-item collaborative filtering." IEEE Internet computing 7.1 (2003): 76-80. (Year: 2003).*

Shay Ben-Elazar, et al., Groove Radio: a Bayesian hierarchical model for personalized playlist generation, In Proceedings of the Tenth ACM International Conference on Web Search and Data Mining (WSDM '17), 2017, 445-453.

Christopher M Bishop, Pattern recognition and machine learning (information science and statistics), Springer-Verlag New York. Inc. Secaucus, NJ, USA, 2006.

David M Blei et al., Latent dirichlet allocation, Journal of machine learning research 3, 2003, 993-1022.

Chris Burges et al., Learning to rank using gradient descent. In Proceedings of the 22nd international conference on Machine learning, ACM, 2005, 89-96.

Cedric De Boom et al., Representation learning for very short texts using weighted word embedding aggregation, Pattern Recognition Letters 2016, 80, 150-156.

James M Dickey, Multiple hypergeometric functions: Probabilistic interpretations and statistical uses, J. Amer. Statist. Assoc, 1983, 78 (383), 628-637.

Thomas George and Srujana Merugu. A scalable collaborative filtering framework based on co-clustering. In Data Mining, Fifth IEEE international conference on. IEEE, 2005, 4.

T Jaakkola and M Jordan, A variational approach to Bayesian logistic regression models and their extensions, In Sixth International Workshop on Artificial Intelligence and Statistics, 1997, vol. 82. 4.

Yehuda Koren, Collaborative Filtering with Temporal Dynamics, Commun, ACM, 2010, 53 (4), 89-97.

Steffen Rendle, Factorization machines, In Data Mining (ICDM), IEEE 10th International Conference on, 2010, 995-1000.

Andriy Shepitsen et al., Personalized recommendation in social tagging systems using hierarchical clustering, In Proceedings of the 2008 ACM conference on Recommender systems, ACM, 2008, 259-266.

Suhang Wang et al., Exploring Implicit Hierarchical Structures for Recommender Systems. In IJCAI, 2015, 1813-1819.

\* cited by examiner ( [0.123, 0.23, 0.345, 0.234], 2, 1, 1)

SYSTEM AND METHOD FOR PERSONALIZED PRODUCT RECOMMENDATION USING HIERARCHICAL BAYESIAN

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to personalized and accurate product recommendation, and more particularly to systems and methods for apparel product recommendation using a multi-level Bayes model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Ecommerce has undergone a hyper growth for years, and a variety of recommendation methods are available to provide target users specific product recommendations, so as to increase sale on an ecommerce platform. Most well-established recommendation algorithms either take flat hierarchical structures or ignore hierarchies. The flat hierarchical structure not only blows up the entire feature space but introduces noise when training the recommendation models. While completely ignoring hierarchies leads to recommendation inaccuracies.

Therefore, an unaddressed need exists in the art to address the aforementioned deficiencies and inadequacies.

SUMMARY

In certain aspects, the present disclosure relates to a method for product recommendation. In certain embodiments, the method includes:

defining, by a computing device, a hierarchical Bayesian model having a latent factor;

training, by the computing device, the hierarchical Bayesian model using a plurality of training events to obtain a trained hierarchical Bayesian model, each event comprising feature of a product, brand of the product, feature of a user, and action of the user upon the product;

predicting, by the computing device, a possibility a target user performing an action on a target product using the trained hierarchical Bayesian model; and providing product recommendation to the target user based on the possibility.

In certain embodiments, the step of defining the hierarchical Bayesian model is performed by:

defining an event t as a four-tuple $(X_t, b_t, u_t, y_t)$, wherein $X_t$ represents features associated with a product of the event t, $b_t$ is a brand of the product, $u_t$ is a user associated with the event t, and $y_t$ is a probability of a user action associated with the event t;

defining hyper parameters $\alpha_w, \beta_w, \alpha_s, \beta_s, \alpha_b, \beta_b, \alpha_u, \beta_u$, and $\gamma$, wherein during the initialization of the hierarchical Bayesian model, $\alpha_w = \beta_w = \alpha_s = \beta_s = \alpha_b = \beta_b = \alpha_u = \beta_u = 0$, $\gamma = 1/S$, and S is a predetermined total number of styles;

defining variance parameters $\delta_w, \delta_s, \delta_b$, and $\delta_u$, wherein the hyper parameters $\alpha_w$ and $\beta_w$ determine the variance parameter $\delta_w$, $\alpha_s$ and $\beta_s$ determine the variance parameter $\delta_s$, $\alpha_b$ and $\beta_b$ determine the variance parameter $\delta_b$, and $\alpha_u$ and $\alpha_u$ determine the variance parameter $\delta_u$, defining a user variable $U_k$ for a user k, $U_k$ having a multivariate Gaussian prior in a form of $N(0, \delta_u^{-1}I)$, k being a positive integer from 1 to U, and I being an identity matrix;

defining a weight variable w having a multivariate Gaussian prior in a form of $N(0, \delta_w^{-1}I)$;

defining a style variable $S_j$ for a style j, $S_j$ having a multivariate Gaussian prior in a form of $N(w, \delta_s^{-1}I)$, j being a positive integer from 1 to S;

defining a style proportion distribution $\theta$ for a brand i as a Dirichlet distribution $Dir(\gamma)$, i being a positive integer in a range of 1 to B;

defining a style assignment variable $Z_i$ for the brand i as a multinomial function $Mult(\theta)$, wherein the style assignment variable $Z_i$ for the brand i has a value of 1 at a position p corresponding to a style $S_p$ of the brand i;

defining a brand variable $B_i$ for the brand i, $B_i$ having a multivariate Gaussian prior in a form of $N(S_p, \delta_b^{-1}I)$; and defining a user action variable $y_t$ as a Bernoulli distribution, wherein for each event t, a probability of a user action $y_t$ is defined as $p(y_t | X_t, B_{b_t}, U_{u_t})$.

In certain embodiments, the user action is a click of an e-commerce webpage of the product. In certain embodiments, B is in a range of 30-1000, and S is in a range of 2-10. In certain embodiments, B is about 200, and S is about 4-7.

In certain embodiments, a probability of the user action $y_t$ for the event t is calculated by:

$$p(y_t | X_t, B_{b_t}, U_{u_t}) = \sigma^{y_t}(h_t) \cdot (1 - \sigma(h_t))^{1-y_t} \quad (1),$$

where $\sigma(\bullet)$ is a standard logistic function, $h_t = X_t^T(B_{b_t} + U_{u_t})$, $X_t^T$ is a vector transpose of $X_t$, $U_{u_t}$ represents user specific information encoded in hierarchical Bayesian for user $u_t$, and $B_{b_t}$ denotes brand specific information.

In certain embodiments, the Dirichlet distribution of the style proportion distribution $\theta$ is defined by:

$$Dir(\theta | \gamma) = \frac{\Gamma\left(\sum_{j=1}^{S} \gamma_j\right)}{\prod_{j=1}^{S} \Gamma(\gamma_j)} \prod_{j=1}^{S} \theta_j^{\gamma_j - 1}.$$

In certain embodiments, the brand variable $B_i$ is defined by:

$$p(B_i | z_i, S, \delta_b) = \prod_j^S p(B_i | S_j, \delta_b)^{I(z_i, j=1)} = \prod_j^S N(B_i; S_j, \delta_b^{-1}I)^{I(z_i, j=1)}$$

where $z_{i,j}$ is the jth element of $z_i$, $\mathbb{1}(\xi)$ is an indicator function that $\mathbb{1}(\xi)=1$ if the statement $\xi$ is true, and $\mathbb{1}(\xi)=0$ if the statement $\xi$ is false.

In certain embodiments, a log joint likelihood of a dataset $\mathcal{D}$, the latent variable Z and a parameter $\Theta$ by given hyper-parameters $\mathcal{H} = \{\gamma, \alpha, \beta\}$ is defined by:

$$\log(p(D,Z,\Theta|\mathcal{H})) = \Sigma_{t=1}^N \log p(y_t|X_t, B_{bt}, U_{ut}) + \Sigma_{i=1}^B \log p(B_i|z_i, S, \delta_b) + \Sigma_{i=1}^B \log p(z_i|\theta) + \Sigma_{j=1}^S \log p(S_j|w, \delta_s) + \log p(\theta|\gamma) + \Sigma_{k=1}^U \log p(U_k|\delta_u) + \log p(w|\delta_w) + \log p(\delta_w|\alpha,\beta) + \log p(\delta_u|\alpha,\beta) + \log p(\delta_b|\alpha,\beta) + \log p(\delta_s|\alpha,\beta) \quad (2),$$

where $\Theta$ is used to denote all model parameters: $\Theta = \{\{U_k\}, \{B_i\}, \{S_j\}, w, \theta, \delta_u, \delta_b, \delta_s, \delta_w\}$, and $k \in \{1, \ldots, U\}, i \in \{1, \ldots, B\}, j \in \{1, \ldots, S\}$.

In certain embodiments, the step of training the hierarchical Bayesian model comprises: solving the formula (2) using variation Bayes approximation of:

$$Q'(q) = \int_\Theta \sum_Z q(Z, \Theta) \log \frac{p(D, Z, \Theta)}{q(Z, \Theta)} d\Theta.$$

In certain embodiments, the step of training the hierarchical Bayesian model further comprises: solving the variation Bayes approximation using Sigmoid approximation of:

$$Q'(q) \geq Q'_\xi(q) = \int_\Theta \sum_Z q(Z, \Theta) \log \frac{p_\xi(D, Z, \Theta)}{q(Z, \Theta)} d\Theta.$$

In certain embodiments, input for the step of prediction includes: feature of the target product, brand of the target product, and feature of the target user.

In certain embodiments, the step of providing product recommendation includes:

predicting possibilities for a set of target products for the target user;

ranking the set of target products based on values of the possibilities from high to low;

choosing a predetermined number of target products from a top of the ranking; and recommending the chosen target products to the user.

In certain aspects, the present disclosure relates to a system for monitoring health of an e-commerce platform. In certain embodiments, the system includes a computing device. The computing device has a processor and a storage device storing computer executable code. The computer executable code, when executed at the processor, is configured to perform the method described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
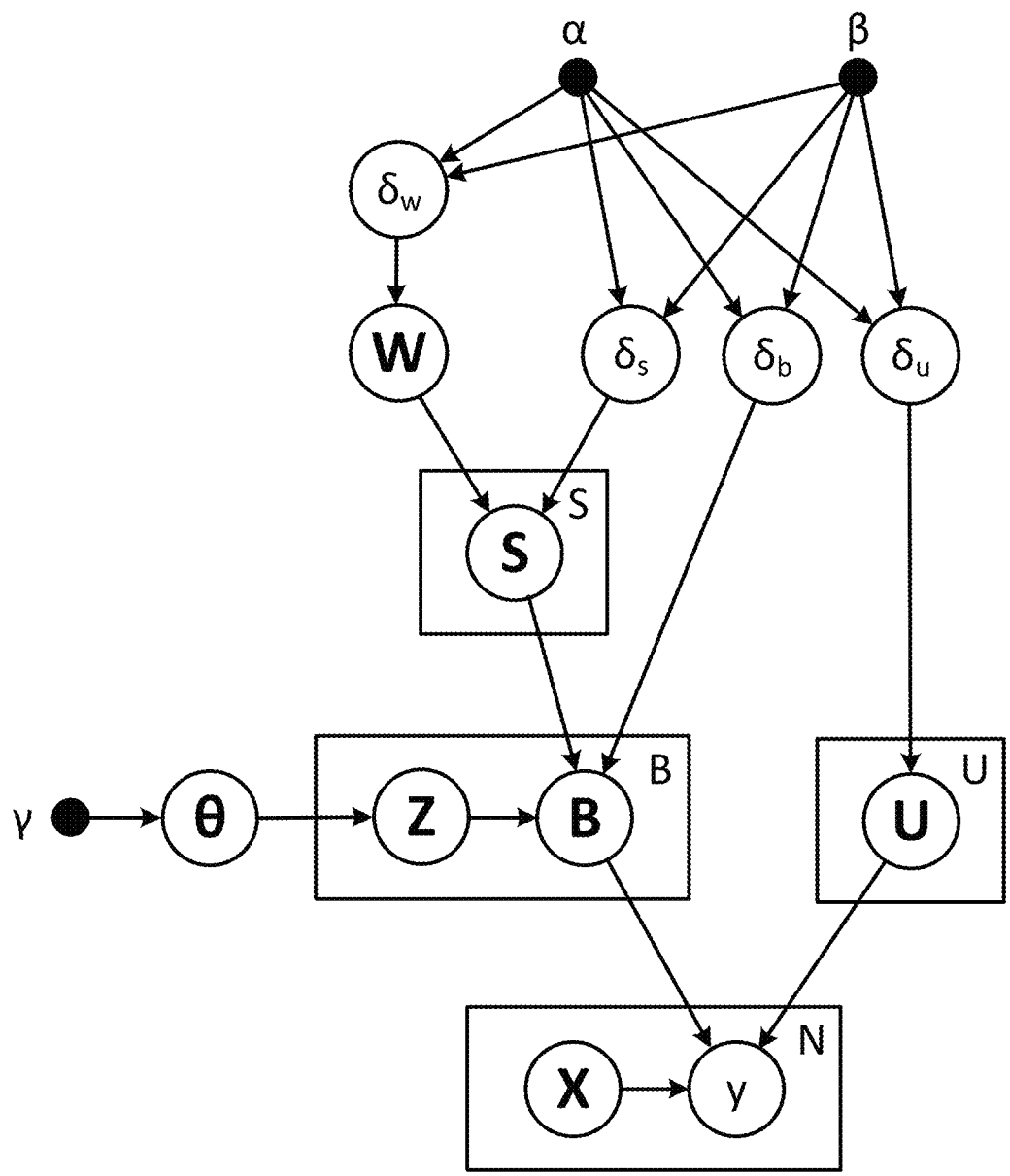
FIG. 1 schematically depicts a hierarchical Bayesian model according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term identify matrix is an n×n matrix with 1's in the diagonal and zeros everywhere else. The identity matrix is denoted by I or $I_n$. An example of an identity matrix is shown as follows:

$$I_3 = \begin{bmatrix} 1 & 0 & 0 \\ 0 & 1 & 0 \\ 0 & 0 & 1 \end{bmatrix}$$

An m×n matrix multiplied by I remains the same, that is, $I_m A = A\ I_n = A$.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

OVERVIEW OF THE DISCLOSURE

As described above, there is a need to take into account hierarchy information for accurate product recommendation. In certain aspects, one way to alleviate this problem is to feed every piece of data from the hierarchy into a complex deep neural network and hope the network itself can figure out a way to use the hierarchical knowledge. However, such approaches usually behave more like black boxes. They are difficult to debug and cannot provide any interpretation of their intermediate results and outcomes.

In certain aspects, a system using a generalized hierarchical Bayesian modeling, i.e., HBayes, is provided. The system is able to capture the hierarchical structural relations and latent relations in the real-world apparel recommendation scenarios. In certain embodiments, the disclosure takes apparel recommendation as a case study for the ease of model description, but the model framework is general enough to be enforced to other hierarchical data recommendation cases. In the following, the disclosure will describe HBayes in greater detail by explaining the latent variables, hierarchy structural relations, and the conditional independence assumptions implied. Furthermore, the disclosure presents a variational inference algorithm for the HBayes framework to provide fast parameter estimation.

Generative Process

FIG. 1 schematically shows a hierarchical Bayesian model according to certain embodiments of the present disclosure. In the real-world scenario, each item or product has to come with a brand and a brand may have more than one items in the hierarchical structures. Therefore, the disclosure denotes each event t as a 4-tuple (Item, Brand, User, IsClick), i.e, $(X_t, b_t, u_t, y_t)$. $X_t$ represents the item features associated with event t and $y_t$ is the binary label that indicates whether user $u_t$ has clicked $X_t$ or not. $b_t$ is the brand of item $X_t$. Furthermore, the disclosure expands the hierarchy by a hidden factor, i.e., "style." Products from each brand $b_t$ tend to exhibit different styles or tastes, which are unknown but exist. In this disclosure, brands are represented as random mixtures over latent styles, where each style is characterized by a distribution over all the items. Let S, B, U and N be the total number of styles, brands, users and events.

The generative process of HBayes can be described as follows:

Step 1. Draw a multivariate Gaussian prior for each user k, i.e., $U_k \sim N(0, \delta_u^{-1} I)$, where $k \in \{1, \ldots, U\}$, where I is an identify matrix having D number of dimensions. In certain embodiments, D is about 50-400. In one embodiment, D is about 140.

Step 2. Draw a multivariate Gaussian prior for each style j, i.e., $S_j \sim N(w, \delta_s^{-1} I)$, where $j \in \{1, \ldots, S\}$, and the number of dimensions of I is D.

Step 3. Draw a style proportion distribution θ for each brand i, i.e., $\theta \sim Dir(\gamma)$, where $i \in \{1, \ldots, B\}$.

Step 4. For each brand i:

Step 4.1 Draw style assignment $z_i$ for brand i where the selected style p is sampled from Multi(θ). $z_i$ is a S×1 one hot encoding vector that $z_{i,p}=1$ and $z_{i,j}=0$ for $j=1, \ldots, p-1, p+1, \ldots, S$. In one example, $z_i$ is in a form of [0, 0, 0, 1, 0, 0, 0], in which S=7 and p=4.

Step 4.2 Draw $B_i \sim N(S_p, \delta_b^{-1} I)$, where the number of dimensions of I is D.

Step 5. For each event t, draw $y_t$ from Bernoulli distribution where the probability p is defined as $p(y_t|x_t, B_{bt}, U_{ut})$.

In the above definition, $(\delta_s, \delta_u, \delta_b$ are the scalar precision parameters and w is the prior mean of $S_j$, and Dir(•) and Multi(•) represent Dirichlet distribution and multinomial distribution, respectively.

With consideration of model flexibility and capacity, the disclosure also treats each distribution's parameter as a random variable and define hyper-priors on top. More specifically, the disclosure draws the prior mean w from $N(0, \delta_w^{-1} I)$, where the number of dimensions of I is D. For $\delta_w, \delta_s, \delta_u, \delta_b$, the disclosure defines Gamma priors over them i.e., $p(\delta_*)=\gamma(\alpha, \beta)$, where $\delta_* \in \{\delta_w, \delta_s, \delta_u, \delta_b\}$.

The family of probability distributions corresponding to this generative process is depicted as a graphical model in FIG. 1. As shown in FIG. 1, there are three hierarchical layers, which are the first layer: the root knot w; the second layer: the style layer S that is unknown in an event; and the third layer: the brand layer B (together with Z). In the figure, α, β, γ are hyperparameters, $\delta_w, \delta_s, \delta_b, \delta_u$ are scalar precision parameters. There are S number of styles S, U number of users U, B number of brand B, and N number of observations y. X, y represent an event, where X is the features of a product, and y is whether a user take an action, such as a "click" of the product webpage. X and y are observed random variables. Z is the one hot encoding vector having a dimensions of S. One of the dimensions is 1 which corresponds to the style of the product, and all the other dimensions are 0. θ is a multinomial distribution.

Probability Priors & Models

In this disclosure, the probability of a single event t given $(X_t; b_t; u_t; y_t)$ is modeled as:

$$p(y_t|X_t, B_{bt}, I_{ut}) = \sigma^{y_t}(h_t) \cdot (1-\sigma(h_t))^{1-y_t} \qquad (1)$$

The $\sigma(\bullet)$ is a standard logistic function, i.e. $\sigma(x) = (1+e^{-x})^{-1}$. $h_t = X_t^T(B_{bt}+U_{ut})$. $X_t^T$ is the vector transpose of $X_t$. $U_{ut}$ represents user specific information encoded in HBayes for user $u_t$, and $B_{bt}$ denotes the brand $b_t$ specific information.

As mentioned in Step 3 of the generative process of HBayes, each brand i's style proportion distribution θ follows a Dirichlet distribution: $p(\theta) \sim Dir(\gamma)$, which is defined as follows:

$$Dir(\theta|\gamma) = \frac{\Gamma\left(\sum_{j=1}^{S} \gamma_j\right)}{\prod_{j=1}^{S} \Gamma(\gamma_j)} \sum_{j=1}^{S} \theta_j^{\gamma_j - 1},$$

where γ is the S-dimensional Dirichlet hyper-parameter. The disclosure initializes $\gamma_j$ by 1/S.

Furthermore, in Step 4 of the generative process of HBayes, a brand is modeled as a random mixture over latent styles. Hence, the disclosure models the brand parameters by a mixture of multivariate Gaussian distribution defined as follows:

$$p(B_i|z_i, S, \delta_b) = \prod_j^S p(B_i|S_j, \delta_b)^{\mathbb{I}(z_i, j=1)}$$

$$= \prod_j^S N(B_i; S_j, \delta_1^{-1} I)^{\mathbb{I}(z_i, j=1)},$$

where $z_{i,j}$ is the jth element of $z_i$, $\mathbb{I}(\xi)$ is an indicator function that $\mathbb{I}(\xi)=1$ if the statement $\xi$ is true, and $\mathbb{I}(\xi)=0$ if the statement $\xi$ is false.

Therefore, the log joint likelihood of the dataset $\mathcal{D}$, latent variable Z and the parameter Θ by given hyper-parameters $\mathcal{H} = \{\gamma, \alpha, \beta\}$ could be written as follows:

$$\log(p(D, Z, \Theta | \mathcal{H})) = \Sigma_{t=1}^N \log p(y_t|X_t, B_{bt}, U_{ut}) + \Sigma_{i=1}^B \log p(B_i|z_i, S, \delta_b) + \Sigma_{i=1}^B \log p(z_i|\theta) + \Sigma_{j=1}^S \log p(S_j|w, \delta_s) + \log p(\theta|\gamma) + \Sigma_{k=1}^U \log p(U_k|\delta_u) + \log p(w|\delta_w) + \log p(\delta_w|\alpha, \beta) + \log p(\delta_u|\alpha, \beta) + \log p(\delta_b|\alpha, \beta) + \log p(\delta_s|\alpha, \beta)$$

Then the disclosure uses Θ to denote all model parameters:

$\Theta = \{\{U_k\}, \{B_i\}, \{S_j\}, w, \theta, \delta_u, \delta_b, \delta_s, \delta_w\}$, where $k \in \{1, \ldots, U\}$, $i \in \{1, \ldots, B\}$, $j \in \{1, \ldots, S\}$.

Optimization

Since both Z and Θ defined by HBayes are unobserved, the disclosure cannot learn HBayes directly. Instead, the disclosure infers the expectations of these latent variables and compute the expected log likelihood of the log joint probability with respect to the latent variable's distribution, i.e., Q function defined in eq. (3).

In the following, the disclosure omits the explicit conditioning on IC for notational brevity.

$$Q = \int_\Theta \Sigma_Z p(Z, \Theta|D) \log(p(D, Z, \Theta)) d\Theta \qquad (3)$$

From the Bayes rule, the posteriors distribution of Z and $\Theta$ can be represented by $$p(Z, \Theta | D) = \frac{p(D, Z, \Theta)}{p(D)}.$$

However, this above distribution is intractable to compute in general. To tackle this problem, a wide variety of approximation inference algorithms are developed, such as Laplace approximation, variational approximation, and Markov Chain Monte Carlo (MCMC) approach, etc.

In this work, the disclosure chooses to solve this problem by using variational Bayes approximation. More specifically, the disclosure approximate the original posterior distribution $p(Z,\Theta|D)$ with a tractable distribution $q(Z,\Theta)$ such that instead of maximizing the Q function defined in eq. (3), the disclosure maximizes the variational free energy defined as:

$$Q'(q) = \int_\Theta \Sigma_Z q(Z, \Theta) \log \frac{p(D, Z, \Theta)}{q(Z, \Theta)} d\Theta, \quad (4)$$

which is also equal to minimize the KL divergence of p(D, Z, $\Theta$) and q(Z,$\Theta$).

Here the we choose to apply Mean Field approximation technique to approximate p(D, Z, $\Theta$), where we assume independence among all different variables (Z and $\Theta$) and define and q(Z, $\Theta$) as follows:

$$q(Z,\Theta)=q(Z)\cdot\Pi_{k=1}^U q(U_k)\cdot\Pi_{j=1}^S q(S_j)\cdot\Pi_{i=1}^B q(B_i)\cdot q(w)\cdot q(\theta)\cdot q(\delta_u)\cdot q(\delta_b)\cdot q(\delta_s)\cdot q(\delta_w) \quad (5),$$

where q denotes different distribution functions for notation brevity. Details of choices of different distributions will be discussed later in this disclosure.

Sigmoid Approximation

The Gaussian priors from the log joint probability (see eq. (2)) are not conjugate to the data likelihood due to the fact that the events in the disclosure are modeled by a sigmoid function (see eq. (1)). In order to conduct tractable inference on Q'(q), a variational lower bound approximation is applied on eq. (1) that has the "squared exponential" form. Therefore, they are conjugate to the Gaussian priors.

$$\sigma(h_t) \geq \sigma(\xi_t) \exp\{\frac{1}{2}(h_t - \xi_t) - \lambda_t(h_t^2 - \xi_t^2)\},$$

where $$\lambda_t = \frac{1}{2\xi_t}\left[\sigma(\xi_t) - \frac{1}{2}\right]$$

and $\xi_t$ is a variational parameter. This lower bound is derived using the convex inequality.

In certain embodiments of the disclosure, each event likelihood can be expressed as follows:

$$\sigma^{y_t}(h_t)\cdot(1-\delta(h_t))^{1-y_t} = \exp(y_t h_t)\sigma(-h_t) \geq \sigma(\xi_t) \exp(y_t h_t - \frac{1}{2}(h_t + \xi_t) - \lambda_t(h_t^2 - \xi_t^2)) \quad (6)$$

By using the sigmoid approximation in eq. (6), the variational free energy Q'(q) (eq. (4)) can be bounded as:

$$Q'(q) \geq Q'_\xi(q) = \int_\Theta \Sigma_Z q(Z, \Theta) \log \frac{p_\xi(D, Z, \Theta)}{q(Z, \Theta)} d\Theta. \quad (7)$$

In the following, the disclosure will maximize the lower bound of the variational free energy $Q'_\xi(q)$ for parameter estimation.

Parameter Estimation

The disclosure develops a novel Variational Bayes (VB) algorithm for HBayes parameter estimation, where in the E-step (estimation step), the disclosure computes the expectation of the hidden variables Z and in the M-step (maximization step), the disclosure tries to find Co that maximizes lower bound of the variational free energy $Q'_\xi(q)$ (eq. (7)). In the VB algorithm, the disclosure uses coordinate ascent variational inference (CAVI) to optimize $Q'_\xi(q)$. CAVI iteratively optimizes each factor of the mean field variational distribution, while holding the others fixed.

Update Expectation of Z

We assume each brand's style membership latent variable is independent and therefore, $q(Z)=\Pi_{i=1}^B q(z_i)$. For each $z_i$, the disclosure parameterizes $q(z_i)$ and update $\mu_{i,j}$ based on the multinomial distribution:

$$q(z_i) = \prod_{j=1}^S \mu_{i,j}^{\mathbb{1}(z_{i,j}=1)}; \mu_{i,j} = \frac{\rho_{i,j}}{\sum_{p=1}^S \rho_{i,p}} \quad (8)$$

$$\ln(\rho_{i,j}) = \mathbb{E}[\ln(\theta_j)] + \frac{d}{2}\mathbb{E}[\ln\delta_b] - \frac{d}{2}\ln(2\pi) - \frac{1}{2}\mathbb{E}[\delta_b(B_i - S_j)^T(B_i - S_j)],$$

where the expectation $\mathbb{E}[\cdot]$ is with respect to the (currently fixed) variational density over $\Theta$ i.e., $\mathbb{E}[\cdot]=\mathbb{E}_{-z}(\cdot)$ in this part. Furthermore, in the following, we note that:

$$\mathbb{E}[z_{i,j}] = \mu_{i,j} \quad (9)$$

Parametrization and Update Rule of q($\theta$):

For the style proportion distribution $\theta$, the disclosure parameterizes q($\theta$) as a Dirichlet distribution, i.e., q($\theta$)=Dir($\theta,\gamma$), and the update rule for $\gamma$ are:

$$\gamma_j = \gamma_j + \Sigma_{i=1}^B \mu_{i,j}, j=1,\ldots,S \quad (10)$$

Parametrization and Update Rule of q($U_k$):

For each user k, k=1, ..., U, the disclosure parameterizes q($U_k$) as a multivariate normal distribution, i.e., q($U_k$)= $\mathcal{N}(U_k; \mu_k^u, \Sigma_k^u)$, and the update rule for $\mu_k^u, \Sigma_k^u$ are:

$$\Sigma_k^u = [\delta_u I + \Sigma_{t=1}^N \mathbb{1}(u_t=k) 2\lambda_t X_t X_t^T]^{-1} \quad (11)$$

$$\mu_k^u = [\Sigma_k^u \mathbb{1}(u_t=k)(y_t-\frac{1}{2}-2\lambda_t X_t^T \mathbb{E}[B_{b_t}])X_t] \quad (12)$$

Parametrization and Update Rule of q($B_i$):

For each brand i, i=1, ..., B, the disclosure parameterizes q($B_i$) as a multivariate normal distribution, i.e., q($B_i$)= $\mathcal{N}(B_i; \mu_i^b, \Sigma_i^b)$, and the update rule for $\mu_i^b, \Sigma_i^b$ are:

$$\Sigma_i^b = [\delta_b \Sigma_{j=1}^S \mu_{i,j} I + \Sigma_{t=1}^N \mathbb{1}(b_t=i) 2\lambda_t X_t X_t^T]^{-1} \quad (13)$$

$$\mu_i^b = \Sigma_i^b [\delta_b \Sigma_{j=1}^S \mu_{i,j} \mathbb{E}[S_j] + \Sigma_{t=1}^N \mathbb{1}(b_t=i)(y_t-\frac{1}{2}-2\lambda_t X_t^T \mathbb{E}[U_{u_t}])X_t] \quad (14)$$

Parametrization and Update Rule of q($S_j$):

For each style j, j=1, ..., S, the disclosure parameterizes q($S_j$) as a multivariate normal distribution, i.e., q($S_j$)= $\mathcal{N}(S_j; \mu_j^s, \Sigma_j^s)$, and the update rule for $\mu_j^s, \Sigma_j^s$ are:

$$\Sigma_j^s = [\delta_s + \delta_b \Sigma_{i=1}^B \mu_{i,j}]^{-1} I \quad (15)$$

$$\mu_j^s = [\delta_s \mathbb{E}[w] + \delta_b \Sigma_{i=1}^B \mu_{i,j} \mathbb{E}[B_i]] \quad (16)$$

Parametrization and Update Rule of q(w):

For the mean variable of style prior w, the disclosure parameterizes q(w) as a multivariate normal distribution, i.e., $q(w)=\mathcal{N}(w; \mu^w, \Sigma^w)$, and the update rule for $\mu^w, \Sigma^w$ are:

$$\Sigma^w = [\delta_w + \delta_s \cdot S]^{-1} I; \quad \mu^w = \Sigma^w [\delta_s \Sigma_{j=1}^S \mathbb{E}[S_j]] \quad (17)$$

Parametrization and Update Rule of $q(\delta_u)$, $q(\delta_b)$, $q(\delta_s)$ and $q(\delta_w)$:

For all the precision parameters' distributions, the disclosure parameterizes them as a Gamma distribution, i.e., $p(\delta_*) = \mathcal{G}(\delta_*; \alpha_*, \beta_*)$, where $\delta_* \in \{\delta_w, \delta_s, \delta_w, \delta_b\}$ and the update rule are $\alpha_{new} = \alpha_{old} + \Delta\alpha$ and $\beta_{new} = \beta_{old} + \Delta\beta$, separately:

$$\Delta\alpha_u = \frac{dU}{2}, \Delta\beta_u = \frac{1}{2}\sum_{k=1}^{U}\mathbb{E}[U_k^T U_k] \quad (18)$$

$$\Delta\alpha_b = \frac{dB}{2}, \Delta\beta_b = \frac{1}{2}\sum_{i=1,j=1}^{B,S}\mu_{i,j}\mathbb{E}[(B_i - S_j)^T(B_i - S_j)]$$

$$\Delta\alpha_S = \frac{dS}{2}, \Delta\beta_S = \frac{1}{2}\sum_{j=1}^{S}\mathbb{E}[(S_j - w)^T(S_j - w)]$$

$$\Delta\alpha_w = \frac{d}{2}, \Delta\beta_w = \frac{1}{2}\mathbb{E}[w^T w]$$

Update Rule of ξ:

For the variational parameters $\xi_t$, t=1, ..., N, in order to maximize $Q'_\xi(q)$ such that the bound on $Q'(q)$ is tight, the update rule is:

$$\xi_t = \sqrt{\mathbb{E}[X_t^T(B_{bt} + u_{ut})^2]}$$

Summary

The parameter estimation method for the HBayes is summarized by the following process:

---
Parameter estimation in HBayes
---
1: INPUT:
2: Hyper-parameters $\mathcal{H}$ : $\mathcal{H} = \{\alpha, \beta, \gamma\}$
3: Data samples $\mathcal{D}$ : $(X_t, b_t, u_t, y_t)$, t = 1, ... , N
4: procedure LEARNING HBAYES
5:    repeat
6:       E-step: compute expectation of Z by eq. (9).
7:       M-step: estimate $\{U_k\}$, $\{B_i\}$, $\{S_j\}$, ω, θ, $\delta_u$, $\delta_b$, $\delta_s$, $\delta_w$, $\xi_t$ by eq.(10) - eq.(19).
8:    until Convergence
9:    return Θ
---

Prediction

In the recommender system according to certain embodiments of the disclosure, the task is to generate the top K product list for each user. Given the user u*, it's straightforward to expose top M products based on the probability of the positive outcomes. For the $m^{th}$ item, the probability is calculated as:

$$\hat{y}_m = p(y_m = 1 | X_m, \mathcal{D}, \mathcal{H}) \approx \int \sigma(h_m) q(Z, \Theta) d\Theta =$$

$$\int \sigma(h_m) \mathcal{N}(h_m | \mu_m, \sigma_m^2) dh_m = \sigma\left(\frac{\mu_m}{\sqrt{1 + \pi\sigma_m^2/8}}\right),$$

where $h_m$ is a random variable with Gaussian distribution:

$$h_m = X_m^T(B_{b_m} + U_{u^*}) \sim \mathcal{N}(h_m; \mu_m, \sigma_m^2)$$

$$\mu_m = \mathbb{E}[X_m^T(B_{b_m} + U_{u^*})]$$

$$\sigma_m^2 = \mathbb{E}[(X_m^T(B_{b_m} + U_{u^*}) - \mu_m)^2] I$$

EMBODIMENTS IMPLEMENTATION AND EXAMPLES OF THE DISCLOSURE

Figure 2:
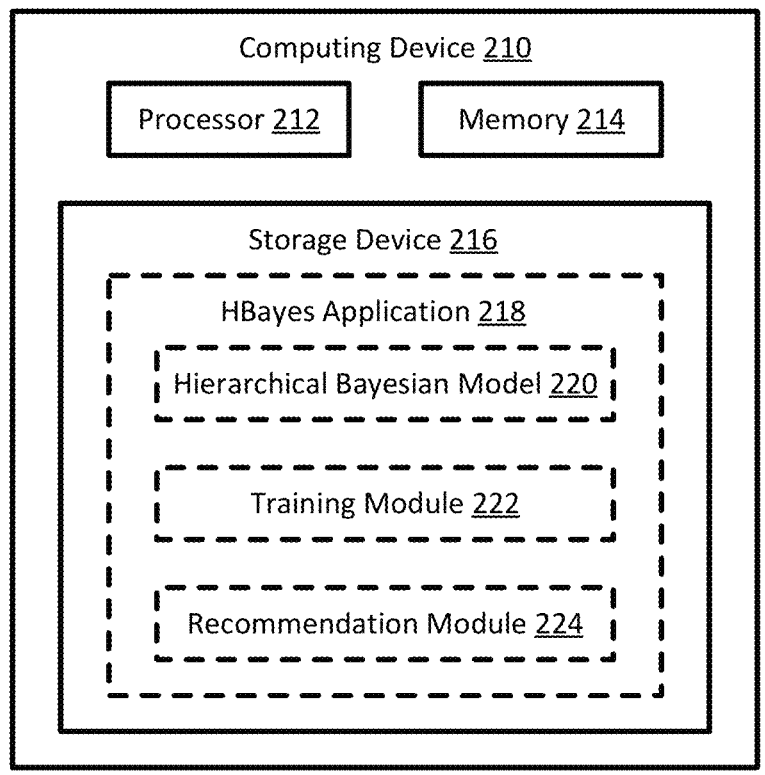
FIG. 2 schematically depicts a product recommendation system according to certain embodiments of the present disclosure.

FIG. 2 schematically depicts a recommendation system for an e-commerce platform according to certain embodiments of the present disclosure. As shown in FIG. 2, the recommendation system 200 includes a computing device 210. The computing device 210 may function as a server or a host computer. In certain embodiments, the computing device 210 may be a cloud computer, a server computer, a cluster, a general-purpose computer, or a specialized computer, which provides recommendation service.

As shown in FIG. 2, the server computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In some embodiments, the computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214. The storage device 216 is a non-volatile data storage media for storing the OS (not shown) and other applications of the computing device 210. Examples of the storage device 216 may include non-volatile memory such as flash memory, memory cards, USB drives, hard drives, floppy disks, optical drives, solid-state drive (SSD), or any other types of data storage devices. In certain embodiments, the storage device 216 may be a local storage, a remote storage, or a cloud storage. In certain embodiments, the computing device 210 may have multiple storage devices 216, which may be identical storage devices or different types of storage devices, and the applications of the computing device 210 may be stored in one or more of the storage devices 216 of the computing device 210.

As shown in FIG. 2, the storage device 216 stores a HBayes application 218. The HBayes application is configured to provide product recommendations to users using a hierarchical Bayesian Model. The HBayes application 218 includes, among other things, hierarchical Bayesian Model 220, a training module 222, and a recommendation module 224. In certain embodiments, the HBayes application 218 may include other applications or modules necessary for the operation of the modules 220-224, such as an interface for a person managing the HBayes application 218 to adjust parameters, instruct inputs, output results, etc. that are necessary for the operation of the HBayes application 218.

It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the HBayes application 218 may be located at a remote computing device or a cloud device.

The hierarchical model 220 is configured to define a hierarchical model. Referring back to FIG. 1, there are three hierarchical layers, which are the root knot w, the style layer S that is unknown in an event, and the brand layer B. The hyperparameters α and β are $\mathcal{G}$ parameters of the $\delta_w$, $\delta_s$, $\delta_b$, $\delta_u$. They are set to 0 during initialization, and after training, become a specific pair of α and β for each of $\delta_w$, $\delta_s$, $\delta_b$, $\delta_u$. The root knot w is defined as a Gaussian distribution, with a standard deviation of $\delta_w^{-1}I$, and a mean initialized at 0. I is an identity matrix, which includes, for example, about 50-400 dimensions, and preferably about 140 dimensions. In certain embodiments, I has the same number of dimensions as that of $X_t$. S is defined as a Gaussian distribution, with a standard deviation of $\delta_s^{-1}I$, and a mean of w. B is defined as a Gaussian distribution, with a standard deviation of $\delta_b^{-1}I$, and a mean of $S_p$. There is S number of styles S. $S_p$ is the style at position p of the S number of styles. Z is a one hot encoding vector with S dimensions, having a value 1 at position p and value 0 at all the other positions. In certain embodiments, the total number of brands B is in a range of 20-2000. In certain embodiments, B is in a range of 50-1000. In certain embodiments, B is in a range of 100-300. In certain embodiments, B is about 200. In certain embodiments, the total number of style S is set in a range of 3-20. In certain embodiments, S is set at about 5. In certain embodiments, S is set at 1%-5% of B. In certain embodiments, S is set at about 2% of B. $X_t$ represents features of an item or specifically a product. In certain embodiments, $X_t$ is a vector having about 50-400 dimensions and preferably about 140 dimensions. In certain embodiments, each dimension is a real number that represents a feature of the product, such as price of the product, weight of the product, color of the product, material of the product, etc.

The training module 222 is configured to, when the hierarchical Bayesian model is defined or constructed by the hierarchical Bayesian model 220, train the hierarchical Bayesian model using training data. In certain embodiments, the training data is obtained from one or more databases from one or more servers that are in communication with the computing device 210. The databased may include product databases and purchase history databases. In certain embodiments, the training module 222 may include a function of, after retrieving related data of products, convert the retrieved data into four tuple format, i.e, ($X_t$, $b_t$, $u_t$, $y_t$). Those four tuple data are used to train the hierarchical Bayesian model until the model converges, and the parameters in the converged model are defined at optimized values.

The recommendation module 224 is configured to, when the hierarchical Bayesian model is well-trained, recommend products for a user. For example, when determining whether a product is appealing to the user, the information of the product is collected and converted into a three tuple format, without the $y_t$ dimension. When the three tuple data is inputted into the well-trained hierarchical Bayesian model, the recommendation module 224 is configured to instruct the hierarchical Bayesian model to obtain $y_t$ corresponding to the three tuple, and the value of the $y_t$ is an indication how likely the user will perform an action, such as click the product when the product is recommended to the user. In certain embodiments, a predetermined or pre-filtered number of products, such as 100-200 products are inputted to the hierarchical Bayesian model for one user, and the $y_t$ values for the products are determined. In certain embodiments, the recommendation module 224 ranks the products based on their $y_t$ values, and certain number of products having the greatest $y_t$ values are selected and recommended to the user. When $y_t$ is 0, the recommendation module 224 predicts that the user will not perform the action, such as click the webpage of the product, and when $y_t$ is 1, the recommendation module 224 predicts that the user will perform the action. The value of $y_t$ indicates the possibility of the user performing the action, and in certain embodiments, a value greater than 0.5 is counted as a high probability.

Figure 3:
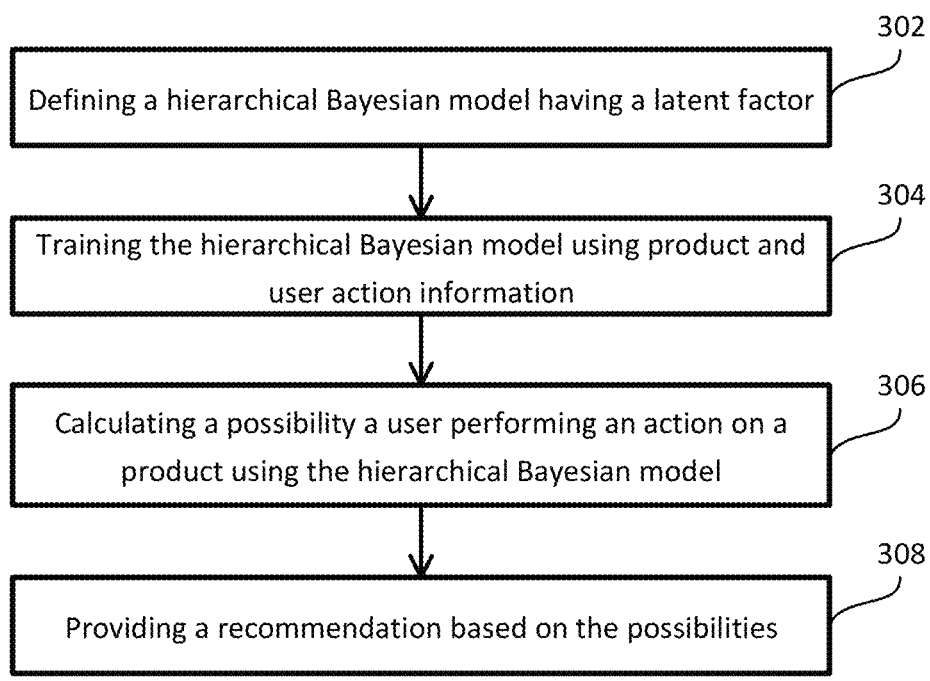
FIG. 3 schematically depicts a method for product recommendation according to certain embodiments of the present disclosure.

FIG. 3 schematically shows a method of product recommendation according to certain embodiments of the present disclosure. In certain embodiments, the method is implemented by the computing device 210 shown in FIG. 2. It should be particularly noted that, unless otherwise stated in the present disclosure, the steps of the method may be arranged in a different sequential order, and are thus not limited to the sequential order as shown in FIG. 3.

At procedure 302, when the HBayes application 218 is in operation, the hierarchical Bayesian model 220 defines a hierarchical Bayesian model as shown in FIG. 1. As described in detail above, the model has three hierarchical layers, where the S layer (styles) in the middle represents a factor that is unknown from 4-tuple data. In certain embodiments, the hierarchical Bayesian model 220 defines the total number of styles as, for example 5.

At procedure 304, after the hierarchical Bayesian model 220 defines the hierarchical Bayesian model, the training module 222 uses a plurality of training data to train the model. The training data is in a format of 4-tuple. In certain embodiments, the training module 222 training module 222 retrieves related data from, for example product database, user database, sales database, and transform those retrieved data into the 4-tuple format. The 4-tuple format data is used as input for the hierarchical Bayesian model, and the training module 222 trains the model using the data to update parameters in the model until convergence, so as to obtain a well-trained model. The model building and model training process at procedures 302 and 304 may be performed in advance, such that the well-trained model is available for being used when necessary. In certain embodiments, the procedures 302 and 304 may be performed independently, and the HBayes application 218 only needs the well-trained model and the recommendation module 224 to provide recommendation service.

When the well-trained model is available, at procedure 306, the recommendation module 224 can be used to predict a possibility of a user performing an action when viewing a recommended product using the well-trained model. Specifically, the recommendation module 224 provides a 3-tuple data for a product, where the three components of the 3-tuple are the item feature, the brand information of the product, and the user information. By inputting the 3-tuple into the well-trained model, the recommendation module 224 can obtain the fourth components, that is, the possibility of the user taking the action. The action is for example a click on a recommended product webpage or on a floating picture having a link to the recommended product webpage. When the possibility is 0, the user is almost impossible to click the recommended product webpage. When the possibility is 1, the user will almost definitely click the recommended product webpage. When the possibility is greater than 0.5, the user is more likely to click the recommended product webpage than not. In certain embodiments, the recommendation module 224 provides an interface, such as a graphic user interface for entering requests and obtain results. In certain embodiments, the recommendation module 224 may request prediction of the possibilities of user action for a set of products by the user. The set of products may be tens of products or hundreds of product, which may be pre-selected from the total number of available products in an e-commerce platform.

At procedure 308, after obtaining the possibilities for the set of products, the recommendation module 224 ranks the products according to the possibility value from high to low, and picks a predetermined number of products from the list, so that the picked products can be recommended to the user.

Figures 4, 5A:
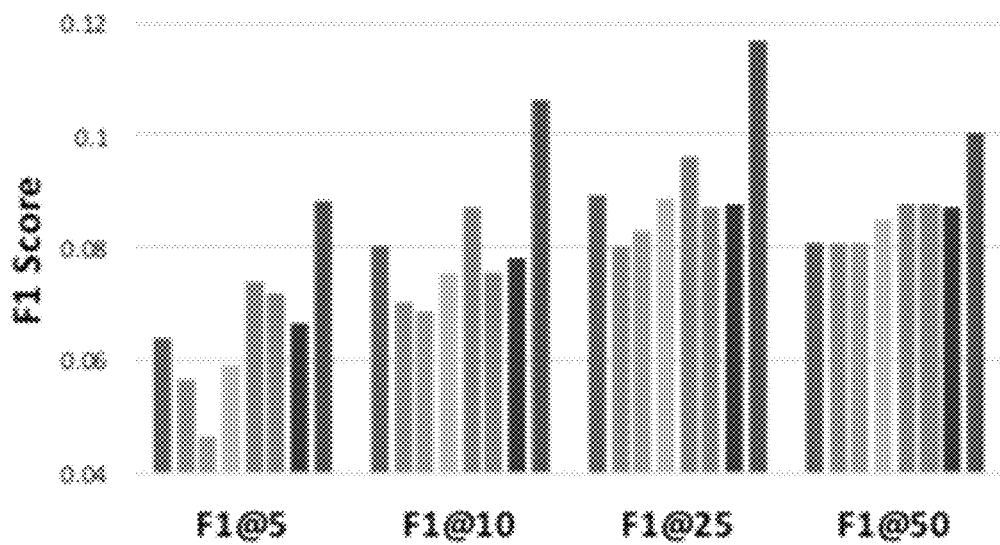
FIG. 4 schematically depicts an event according to certain embodiments of the present disclosure.
FIG. 5A schematically depicts F-1 score with different number of recommended products according to certain embodiments of the disclosure compared with other methods.

FIG. 4 schematically depicts an example of a 4-tuple event according to certain embodiments of the present disclosure. In this exemplary event, assumes U=10, B=7, S=5, and the dimension of X is 4, the input of the event t ($X_t$, $b_t$, $u_t$, $y_t$) is:

$X_t$=[0.123, 0.23, 0.345, 0.234],
$b_t$=2,
$u_t$=1,
$y_t$=1, where the dimensions of $X_t$ is 4; $b_t$ has a value of 2, which corresponds to a vector B_t of [0, 0, 1, 0, 0], the vector has 5 positions from 0-4, and the value 2 corresponds to position 1 of the 5 positions; $u_t$ has a value of 1, which corresponds to a vector U_t of [0, 1, 0, 0, 0, 0, 0, 0, 0, 0], the vector has 10 positions from 0-9, and the value 1 corresponds to position 1 of the 10 positions. In practice, the dimensions U (user) and B (brand) are much larger, such as about 140 and 200, respectively, the dimensions of S (style) may be about 5, while $y_t$ is a real number of 0 or 1 of a known event, or during prediction, a number between 0 and 1.

In certain embodiments, apparel data from a large e-commerce company is used for the recommendation system. In this dataset, each sample represents a particular apparel product which is recorded by various features including: categories, titles, and other properties, etc. Meanwhile, the user click information is also recorded and translated into data labels. Throughout the embodiment, positive labels indicate that certain recommended products are clicked by the user, whereas negative samples indicate that the recommended products are skipped by the user which usually implies that the user is 'lack of interest' towards that certain item. By data cleaning and preprocessing: (1) merging duplicated histories; (2) removing users of too few records, the post-processed data set ends up with 895 users, 81223 products, 5535 brands with 380595 uniquely observed user-item pairs. On average, each user has 425 products records, ranging from 105 to 2048, and 61.2% of the users have fewer than 425 product clicking records. For each item, we encode the popularity and category features into a 20 dimensional feature vector; title and product property into a 50 dimensional feature vector. Combining with all features, the total dimension of each sample ends up with 140.

Feature Analysis:

The apparel data are composed of four types of features: (1) product popularity; (2) product category; (3) product title; (4) product properties. Based on this embodiment, we briefly explain each feature's physical meaning and how we process the data as follows:

Product Popularity (POP): product popularity is a measure of the prevalence of certain items in the dataset. In general, customers have preference for a particular product during a period of time. This phenomenon is pretty common for apparel products (e.g. apparels' popularity in certain styles may be affected by certain people or events, especially by those important public figures). For a particular product i, the popularity is defined as: $POP_i = n_{xi}/N$, where $n_{xi}$ are the number of orders or the contribution of gross merchandise volume (GMV) for product i, and Nx is the summation of $n_{xi}$ across all products in the dataset.

Product Category (CID): In e-commerce, items are clustered into different groups based on the alliance/similarity of the item functionalities and utilities. In e-commerce websites, such an explicit hierarchy usually exists. We encode each item's category into a high dimensional vector via one-hot encoding and adjust the feature weights by the popularity of such category.

Product Title (TITLE): product titles are created by vendors and they are typically in the forms of natural languages indicating the item functionality and utility. Examples could be like 'INMAN short sleeve round neck triple color block stripe T-shirt 2017.' We preprocess the product titles by generating the sentence embedding. The main idea is to average the wording weights in the title sentence based on the inverse document frequency (IDF) value of each individual word involved.

Product Property Features (PROP): other product metadata features are also provided in the apparel dataset. For instance, the color feature of items takes values such like: 'black', 'white', 'red', etc., and the sizing feature takes values such like: "S," "M," "L," "XL," etc. Similar to category features, product properties are first encoded into binary vectors $x_i \in \{0,1\}^{|M|}$, where N denotes the set of all possible product values. Then the property binary vectors are hashed into fixed length (50) vectors.

On one hand, by utilizing more features HBayes in general reaches better performance in terms of precision-recall metrics. We report PR-AUC in Table 1 to prove this argument; on the other hand, more features need more training time.

TABLE 1

Model performance under different feature combinations in terms of PR AUC

| Features | PR AUC |
|---|---|
| POP | 0.0406 |
| POP + CID | 0.0414 |
| POP + CID + TITLE | 0.0489 |
| POP + CID + TITLE + PROP | 0.0491 |

Figure 5B:
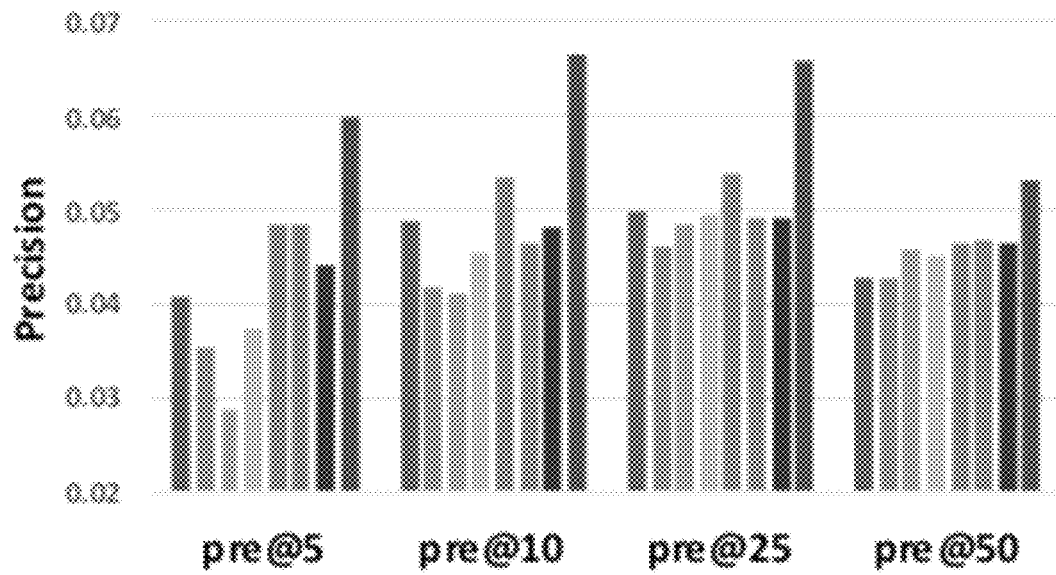
FIG. 5B schematically prediction precision with different number of recommended products according to certain embodiments of the disclosure compared with other methods.
Figure 5C:
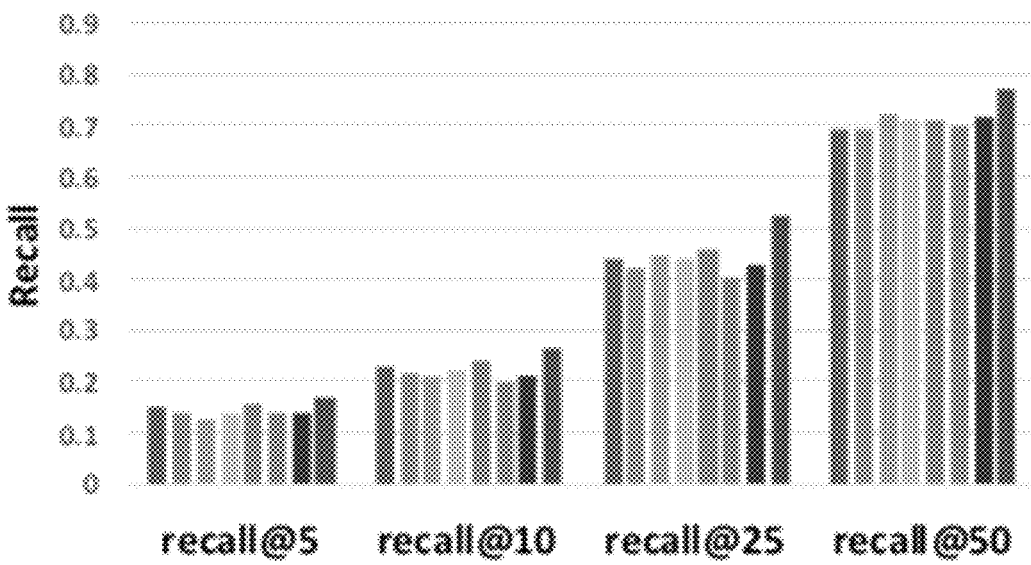
FIG. 5C schematically depicts recall rate with different number of recommended products according to certain embodiments of the disclosure compared with other methods.

Performance Comparison:

We first report the model performance regarding precision, recall, as well as F1-score for HBayes against other baselines in FIGS. 5A-5C, where FIG. 5A shows F1@K on Apparel data, FIG. 5B shows Precision@K on Apparel data, and FIG. 5C shows Recall@K on Apparel data. As shown in the figures, when each method recommends fewer number of products (K=5), HBayes does not show the superiority regarding with recalls, with the increment of recommended items, the recall for HBayes becomes much better against others, which implies HBayes is really efficient in terms of finding items that people tend to take interest in. In the sense of precision, HBayes is consistently better than other baseline methods which implies HBayes is much more accurate in terms of item classification under different K. Given the performance of precisions and recalls, HBayes is much better regarding F1-score with different K for apparel recommendation.

Regarding the ranking quality, we use NDCG to report each method's performance in Table 2. HBayes is superior against other baseline methods throughout different K recommended. Specially, HBayes beats the second best HPF at K=5 by 10.3%, at K=10 by 12.4%, at K=25 by 14.7% and at K=50 by 11.2%.

TABLE 2

NDCG on apparel recommendations

| Method | NDCG@5 | NDCG@10 | NDCG@25 | NDCG@50 |
|---|---|---|---|---|
| CoClustering | 0.1288 | 0.1637 | 0.2365 | 0.3050 |
| NMF | 0.1249 | 0.0156 | 0.2272 | 0.3020 |
| SVD++ | 0.1138 | 0.1487 | 0.2287 | 0.3073 |
| HSR | 0.1266 | 0.1603 | 0.2354 | 0.3107 |
| HPF | 0.1412 | 0.1757 | 0.2503 | 0.3229 |
| FM | 0.1363 | 0.1592 | 0.2291 | 0.3117 |
| LambdaMART | 0.1287 | 0.1585 | 0.2304 | 0.3123 |
| HBayes | 0.1557 | 0.1974 | 0.2871 | 0.3590 |

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] Shay Ben-Elazar, et al., Groove Radio: a Bayesian hierarchical model for personalized playlist generation, In Proceedings of the Tenth ACM International Conference on Web Search and Data Mining (WSDM '17), 2017, 445-453.

[2] Christopher M Bishop, Pattern recognition and machine learning (information science and statistics), Springer-Verlag New York. Inc. Secaucus, N.J., USA, 2006.

[3] David M Blei et al., Latent dirichlet allocation, Journal of machine learning research 3, 2003, 993-1022.

[4] Chris Burges et al., Learning to rank using gradient descent. In Proceedings of the 22nd international conference on Machine learning, ACM, 2005, 89-96.

[5] Cedric De Boom et al., Representation learning for very short texts using weighted word embedding aggregation, Pattern Recognition Letters 2016, 80, 150-156.

[6] James M Dickey, Multiple hypergeometric functions: Probabilistic interpretations and statistical uses, J. Amer. Statist. Assoc, 1983, 78 (383), 628-637.

[7] Thomas George and Srujana Merugu. A scalable collaborative filtering framework based on co-clustering. In Data Mining, Fifth IEEE international conference on. IEEE, 2005, 4.

[8] T Jaakkola and M Jordan, A variational approach to Bayesian logistic regression models and their extensions, In Sixth International Workshop on Artificial Intelligence and Statistics, 1997, Vol. 82. 4.

[9] Yehuda Koren, Collaborative Filtering with Temporal Dynamics, Commun, A C M, 2010, 53 (4), 89-97.

[10] Steffen Rendle, Factorization machines, In Data Mining (ICDM), IEEE 10th International Conference on, 2010, IEEE, 995-1000.

[11] Andriy Shepitsen et al., Personalized recommendation in social tagging systems using hierarchical clustering, In Proceedings of the 2008 ACM conference on Recommender systems, ACM, 2008, 259-266.

[12] Suhang Wang et al., Exploring Implicit Hierarchical Structures for Recommender Systems. In IJCAI, 2015, 1813-1819.

What is claimed is:

1. A method for product recommendation, comprising:
defining, by a computing device, a hierarchical Bayesian model having a latent factor;
training, by the computing device, the hierarchical Bayesian model using a plurality of training events to obtain a trained hierarchical Bayesian model, each event comprising feature of a product, brand of the product, feature of a user, and action of the user upon the product;
predicting, by the computing device, a possibility a target user performing an action on a target product using the trained hierarchical Bayesian model; and
providing product recommendation to the target user based on the possibility,
wherein the step of defining the hierarchical Bayesian model is performed by:
defining an event t as a four-tuple $(X_t, b_t, u_t, y_t)$, wherein $X_t$ represents features associated with a product of the event t, $b_t$ is a brand of the product, $u_t$ is a user associated with the event t, and $y_t$ is a probability of a user action associated with the event t;
defining hyper parameters $\alpha_w, \beta_w, \alpha_s, \beta_s, \alpha_b, \beta_b, \alpha_u, \beta_u$, and $\gamma$, wherein during the initialization of the hierarchical Bayesian model, $\alpha_w=\beta_w=\alpha_s=\beta_s=\alpha_b=\beta_b=\alpha_u=\beta_u=0$, $\gamma=1/S$, and S is a predetermined total number of styles;
defining variance parameters $\delta_w, \delta_s, \delta_b$, and $\delta_u$, wherein the hyper parameters $\alpha_w$ and $\beta_w$ determine the variance parameter $\delta_w$, $\alpha_s$, and $\beta_s$ determine the variance parameter $\delta_s$, $\alpha_b$, and $\beta_b$ determine the variance parameter $\delta_b$, and $\alpha_u$, and $\beta_u$ determine the variance parameter $\delta_u$;
defining a user variable $U_k$ for a user k, $U_k$ having a multivariate Gaussian prior in a form of $N(0,\delta_u^{-1}I)$, k being a positive integer from 1 to U, and I being an identity matrix;
defining a weight variable w having a multivariate Gaussian prior in a form of $N(0,\delta_u^{-1}I)$;
defining a style variable $S_j$ for a style j, $S_j$ having a multivariate Gaussian prior in a form of $N(w,\delta_s^{-1}I)$, j being a positive integer from 1 to S;
defining a style proportion distribution θ for a brand i as a Dirichlet distribution Dir(γ), i being a positive integer in a range of 1 to B;
defining a style assignment variable $Z_i$ for the brand i as a multinomial function Mult(θ), wherein the style assignment variable $Z_i$ for the brand i has a value of 1 at a position p corresponding to a style $S_p$ of the brand i;

defining a brand variable $B_i$ for the brand i, $B_i$ having a multivariate Gaussian prior in a form of $N(S_p, \delta_b^{-1}I)$; and defining a user action variable $y_t$ as a Bernoulli distribution, wherein for each event t, a probability of a user action $y_t$ is defined as $p(y_t|X_t,B_{b_t},U_{u_t})$.

2. The method of claim 1, wherein the user action is a click of an e-commerce webpage of the product.

3. The method of claim 1, wherein B is in a range of 30-1000, and S is in a range of 2-10.

4. The method of claim 3, wherein B is about 200, and S is about 4-7.

5. The method of claim 1, wherein a probability of the user action $y_t$ for the event t is calculated by:

$$p(y_t|X_t,B_{b_t},U_{u_t})=\sigma^{y_t}(h_t)\cdot(1-\sigma(h_t))^{1-y_t} \quad (1),$$

wherein $\sigma(\cdot)$ is a standard logistic function, $h_t=X_t^T(B_{b_t}+U_{u_t})$, $X_t^T$ is a vector transpose of $X_t$, $U_{u_t}$ represents user specific information encoded in hierarchical Bayesian for user $u_t$, and $B_{b_t}$ denotes brand specific information.

6. The method of claim 5, wherein the Dirichlet distribution of the style proportion distribution θ is defined by:

$$Dir(\theta|\gamma) = \frac{\Gamma\left(\sum_{j=1}^{S}\gamma_j\right)}{\prod_{j=1}^{S}\Gamma(\gamma_j)}\prod_{j=1}^{S}\theta_j^{\gamma_j-1}.$$

7. The method of claim 6, wherein the brand variable $B_i$ is defined by:

$$p(B_i|z_i,S,\delta_b) = \prod_j^S p(B_i|S_j,\delta_b)^{\mathbb{I}(z_i,j=1)}$$

$$= \prod_j^S N(B_i;S_j,\delta_b^{-1}I)^{\mathbb{I}(z_i,j=1)}$$

P where $z_{i,j}$ is the jth element of $z_i$, $\mathbb{I}(\xi)$ is an indicator function that $\mathbb{I}(\xi)=1$ if the statement $\xi$ is true, and $\mathbb{I}(\xi)=0$ if the statement $\xi$ is false.

8. The method of claim 1, wherein a log joint likelihood of a dataset $\mathcal{D}$, the latent variable Z and a parameter $\Theta$ by given hyper-parameters $\mathcal{H}=\{\gamma, \alpha, \beta\}$ is defined by:

$$\log(p(D,Z,\Theta|\mathcal{H}))=\Sigma_{t=1}^N \log p(y_t|X_t,B_{b_t},U_{u_t})+\Sigma_{i=1}^B \log p(B_i|z_i,S,\delta_b)+\Sigma_{i=1}^B \log p(z_i|\theta)+\Sigma_{j=1}^S \log p(S_j|w,\delta_s)+\log p(\theta|\gamma)+\Sigma_{k=1}^U \log p(U_k|\delta_u)+\log p(w|\delta_w)+\log p(\delta_w|\alpha,\beta)+\log p(\delta_u|\alpha,\beta)+\log p(\delta_b|\alpha,\beta)+\log p(\delta_s|\alpha,\beta) \quad (2),$$

wherein Θ is used to denote all model parameters: $\Theta=\{\{U_k\},\{B_i\},\{S_j\},w,\theta,\delta_u,\delta_b,\delta_s,\delta_w\}$, and $k\in\{1,\ldots,U\}$, $i\in\{1,\ldots,B\}$, $j\in\{1,\ldots,S\}$.

9. The method of claim 8, wherein the step of training the hierarchical Bayesian model comprises: solving the formula (2) using variation Bayes approximation of:

$$Q'(q) = \int_\Theta \sum_Z q(Z,\Theta)\log\frac{p(D,Z,\Theta)}{q(Z,\Theta)}d\Theta.$$

10. The method of claim 9, wherein the step of training the hierarchical Bayesian model further comprises: solving the variation Bayes approximation using Sigmoid approximation of:

$$Q'(q) \geq Q'_\xi(q) = \int_\Theta \sum_Z q(Z,\Theta)\log\frac{p_\xi(D,Z,\Theta)}{q(Z,\Theta)}d\Theta.$$

11. The method of claim 1, wherein input for the step of prediction comprises: feature of the target product, brand of the target product, and feature of the target user.

12. The method of claim 1, wherein the step of providing product recommendation comprises:
predicting possibilities for a set of target products for the target user;
ranking the set of target products based on values of the possibilities from high to low;
choosing a predetermined number of target products from a top of the ranking; and
recommending the chosen target products to the user.

13. A system for product recommendation, the system comprising a computing device, the computing device comprising a processor and a storage device storing computer executable code, wherein the computer executable code, when executed at the processor, is configured to:
define a hierarchical Bayesian model having a latent factor;
train the hierarchical Bayesian model using a plurality of training events to obtain a trained hierarchical Bayesian model, each event comprising feature of a product, brand of the product, feature of a user, and action of the user upon the product;
predict a possibility a target user performing an action on a target product using the trained hierarchical Bayesian model; and
provide product recommendation to the target user based on the possibility,
wherein the computer executable code is configured to define the hierarchical Bayesian model by:
defining an event t as a four-tuple $(X_t,b_t,u_t,y_t)$, wherein $X_t$ represents features associated with a product of the event t, $b_t$ is a brand of the product, $u_t$ is a user associated with the event t, and $y_t$ is a probability of a user action associated with the event t:
defining hyper parameters $\alpha_w, \beta_w, \alpha_s, \beta_s, \alpha_b, \beta_b, \alpha_u, \beta_u,$ and γ, wherein during the initialization of the hierarchical Bayesian model, $\alpha_w=\beta_w=\alpha_s=\beta_s=\alpha_b=\beta_b=\alpha_u=\beta_u=0$, γ=1/S, and S is a predetermined total number of styles;
defining variance parameters $\gamma_w, \gamma_s, \gamma_b,$ and $\gamma_u$, wherein the hyper parameters $\alpha_w$ and $\beta_w$ determine the variance parameter $\gamma_w$, $\alpha_s$ and $\beta_s$ determine the variance parameter $\delta_s$, $\alpha_b$ and $\beta_b$ determine the variance parameter $\delta_b$, and $\alpha_u$, and $\beta_u$ determine the variance parameter $\delta_u$;
defining a user variable $U_k$ for a user k, $U_k$ having a multivariate Gaussian prior in a form of $N(0,\delta_u^{-1}I)$, k being a positive integer from 1 to U, and I being an identity matrix;
defining a weight variable w having a multivariate Gaussian prior in a form of $N(0,\delta_w^{-1}I)$;
defining a style variable $S_j$ for a style j, $S_j$ having a multivariate Gaussian prior in a form of $N(w,\delta_w^{-1}I)$, j being a positive integer from 1 to S;

defining a style proportion distribution θ for a brand i as a Dirichlet distribution Dir(γ), i being a positive integer in a range of 1 to B;

defining a style assignment variable $Z_i$ for the brand i as a multinomial function Mult(θ), wherein the style assignment variable $Z_i$ for the brand i has a value of 1 at a position p corresponding to a style $S_p$ of the brand i;

defining a brand variable $B_i$ for the brand i, $B_i$ having a multivariate Gaussian prior in a form of $N(S_p, \delta_b^{-1}I)$; and defining a user action variable $y_t$ as a Bernoulli distribution, wherein for each event t, a probability of a user action $y_t$ is defined as $p(y_t|X_t, B_{b_t}, U_{u_t})$.

14. The system of claim 13, wherein B is in a range of 30-1000, and S is in a range of 2-10.

15. The system of claim 13, wherein:

a probability of the user action yt for the event t is calculated by:

$$p(y_t|X_t, B_{b_t}, I_{u_t}) = \sigma^{y_t}(h_t) \cdot (1 - \sigma(h_t))^{1-y_t} \quad (1)$$

wherein σ(•) is a standard logistic function, $h_t = X_t^T(B_{b_t} + U_{u_t})$. $X_t^T$ is the vector transpose of $X_t$, $U_{u_t}$ represents user specific information encoded in hierarchical Bayesian for user $u_t$, and $B_{b_t}$ denotes brand specific information; and a log joint likelihood of a dataset $\mathcal{D}$, the latent variable Z and a parameter Θ by given hyper-parameters $\mathcal{H} = \{\gamma, \alpha, \beta\}$ is defined by:

$$\log(p(D,Z,\Theta|\mathcal{H})) = \Sigma_{i=1}^N \log p(y_t|X_t, B_{b_t}, U_{u_t}) + \Sigma_{i=1}^B \log p(B_i|z_i, S, \delta_b) + \Sigma_{i=1}^B \log p(z_i|\theta) + \Sigma_{j=1}^S \log p(S_j|w, \delta_s) + \log p(\theta|\gamma) + \Sigma_{k=1}^U \log p(U_k|\delta_u) + \log p(w|\delta_w) + \log p(\delta_w|\alpha,\beta) + \log p(\delta_u|\alpha,\beta) + \log p(\delta_b|\alpha,\beta) + \log p(\delta_s|\alpha,\beta),$$

wherein σ is used to denote all model parameters: $\Theta = \{\{U_k\}, \{B_i\}, \{S_j\}, w, \theta, \delta_u, \delta_b, \delta_s, \delta_w\}$, and k∈{1, . . . , U}, i∈{1, . . . , B}, j∈{1, . . . , S}.

16. The system of claim 15, wherein the computer executable code is configured to train the hierarchical Bayesian model by: solving the formula (2) using variation Bayes approximation of:

$$Q'(q) = \int_\Theta \sum_Z q(Z, \Theta) \log \frac{p(D, Z, \Theta)}{q(Z, \Theta)} d\Theta.$$

17. The system of claim 16, wherein the computer executable code is configured to train the hierarchical Bayesian model by: solving the variation Bayes approximation using Sigmoid approximation of:

$$Q'(q) \geq Q'_\xi(q) = \int_\Theta \sum_Z q(Z, \Theta) \log \frac{p_\xi(D, Z, \Theta)}{q(Z, \Theta)} d\Theta.$$

18. A non-transitory computer readable medium storing computer executable code, wherein the computer executable code, when executed at a processor of a computing device, is configured to:

define a hierarchical Bayesian model having a latent factor;

train the hierarchical Bayesian model using a plurality of training events to obtain a trained hierarchical Bayesian model, each event comprising feature of a product, brand of the product, feature of a user, and action of the user upon the product;

predict a possibility a target user performing an action on a target product using the trained hierarchical Bayesian model; and provide product recommendation to the target user based on the possibility wherein the computer executable code is configured to define the hierarchical Bayesian model by:

defining an event t as a four-tuple $(X_t, b_t, u_t, y_t)$, wherein $X_t$ represents features associated with a product of the event t, $b_t$ is a brand of the product, $u_t$ is a user associated with the event t, and $y_t$ is a probability of a user action associated with the event t:

defining hyper parameters $\alpha_w, \beta_w, \alpha_s, \beta_s, \alpha_b, \beta_b, \alpha_u, \beta_u$, and γ, wherein during the initialization of the hierarchical Bayesian model, $\alpha_w = \beta_w = \alpha_s = \beta_s = \alpha_b = \beta_b = \alpha_u = \beta_u = 0$, γ=1/S, and S is a predetermined total number of styles;

defining variance parameters $\delta_w, \delta_s, \delta_b$, and $\delta_u$, wherein the hyper parameters $\alpha_w$ and $\beta_w$ determine the variance parameter $\delta_w$, $\alpha_s$ and $\beta_s$ determine the variance parameter $\delta_s$, $\alpha_b$ and $\beta_b$ determine the variance parameter $\delta_b$, and $\alpha_u$, and $\beta_u$ determine the variance parameter $\delta_u$;

defining a user variable $U_k$ for a user k, $U_k$ having a multivariate Gaussian prior in a form of $N(0, \delta_w^{-1}I)$, k being a positive integer from 1 to U, and I being an identity matrix:

defining a weight variable w having a multivariate Gaussian prior in a form of $N(0, \delta_w^{-1}I)$;

defining a style variable $S_j$ for a style j, $S_j$ having a multivariate Gaussian prior in a form of $N(w, \delta_s^{-1}I)$, j being a positive integer from 1 to S, defining a style proportion distribution θ for a brand i as a Dirichlet distribution Dir(γ), i being a positive integer in a range of 1 to B;

defining a style assignment variable $Z_i$ for the brand i as a multinomial function Mult(θ), wherein the style assignment variable $Z_i$ for the brand i has a value of 1 at a position p corresponding to a style $S_p$ of the brand i;

defining a brand variable $B_i$ for the brand i, $B_i$ having a multivariate Gaussian prior in a form of $N(S_p, \delta_b^{-1}I)$; and defining a user action variable $y_t$ as a Bernoulli distribution, wherein for each event t, a probability of a user action $y_t$ is defined as $p(y_t|X_t, B_{b_t}, U_{u_t})$.

* * * * *